March 31, 1942. L. L. HOUCHIN 2,278,314
APPARATUS FOR PRODUCING ONE-PIECE MULTIFOCAL OPHTHALMIC LENSES
Filed Jan. 31, 1940   5 Sheets-Sheet 1

INVENTOR
Lowell L. Houchin.
BY
ATTORNEYS

March 31, 1942.  L. L. HOUCHIN  2,278,314
APPARATUS FOR PRODUCING ONE-PIECE MULTIFOCAL OPHTHALMIC LENSES
Filed Jan. 31, 1940  5 Sheets-Sheet 2

INVENTOR
Lowell L. Houchin.
BY
ATTORNEYS

INVENTOR
Lowell L. Houchin
BY
ATTORNEYS

March 31, 1942.  L. L. HOUCHIN  2,278,314
APPARATUS FOR PRODUCING ONE-PIECE MULTIFOCAL OPHTHALMIC LENSES
Filed Jan. 31, 1940  5 Sheets-Sheet 5

INVENTOR
Lowell L. Houchin.
BY
ATTORNEYS

Patented Mar. 31, 1942

2,278,314

UNITED STATES PATENT OFFICE 2,278,314

APPARATUS FOR PRODUCING ONE-PIECE MULTIFOCAL OPHTHALMIC LENSES

Lowell L. Houchin, Columbus, Ohio, assignor to The Revalens Co., Columbus, Ohio, a corporation of Ohio Application January 31, 1940, Serial No. 316,691

15 Claims. (Cl. 51—124)

My invention relates to apparatus for producing one-piece multifocal ophthalmic lenses. It relates, more particularly, to a novel apparatus for grinding a segment or cavity in the surface of a lens blank, the cavity being of a selected outline and curvature. However, my machine may be used for other purposes.

In my co-pending application directed to multifocal ophthalmic lenses, Serial No. 313,871, filed January 15, 1940, I disclose various forms of multifocal ophthalmic lens blanks having inner segments or cavities of various outlines. The present invention may be employed for grinding into the surface of the lens blank any of the segments illustrated in said application. However, the machine may also be employed for producing segments or cavities of other shapes or outlines and may even be employed for other purposes.

One of the objects of my invention is to provide apparatus which is of such a nature that it may be used for producing multifocal lenses having segments of various predetermined outlines, sizes and curvatures.

Another object of my invention is to provide apparatus for producing one-piece multifocal ophthalmic lenses and particularly the segments thereof which is of such a nature that the lenses produced thereon will be of a superior quality.

Another object of my invention is to provide apparatus for producing one-piece multifocal ophthalmic lenses which is simple in structure, easy to operate and which is positive and efficient in operation.

Another object of my invention is to provide an apparatus which is of such a nature that it will accurately produce segments of a predetermined shape in a lens blank and is of such a nature that it will produce segments of identical shape in a multiplicity of lens blanks.

Another object of my invention is to provide an apparatus of the type indicated which is of such a nature that it may be adjusted readily to produce segments of various shapes and sizes and of various curvatures.

My invention is particularly useful for forming segments of non-circular form in a lens blank which has been previously surfaced to form an inner centrally disposed circular near vision portion and an outer surrounding distance vision portion, the two portions being of different curvature. My machine may be used for grinding away a portion of the circular near vision portion to produce a segment or cavity in the surface of the lens, the segment or cavity being of a predetermined curvature and non-circular outline. However, my machine may be used for grinding into any lens surface a segment or cavity.

My machine preferably comprises an abrading or grinding tool which is mounted on a vertically disposed spindle for rotation about its own axis. This tool is adapted to contact with the upper surface of a horizontally disposed lens blank mounted on a suitable lens blank carrier. The lens blank carrier is mounted on a suitable support for oscillating movement in a vertical plane relative to the abrading tool. Since the tool contacts with the lens blank, during this oscillating movement, an elongated cavity or segment will be produced in the surface of the lens blank. The radius of curvature of the bottom surface of this segment will depend upon the radius of the swing or oscillation of the lens blank carrier. I provide means in my machine for adjusting this radius. Merely having the lens blank carrier swing in one plane relative to the grinding tool would result in the production of an elongated cavity having straight sides. My machine may be employed for producing a cavity of such form. However, it may also be employed for producing cavities or segments having curved or arched sides variously arranged relative to each other. For this purpose the lens blank carrier is also so mounted that it may be swung or oscillated in a vertical plane at right angles to the plane of oscillation mentioned above. I provide a suitable template for controlling this latter movement. This template may have any suitable shape and the shape of the segment or cavity produced will depend in part upon the shape of the template.

The preferred embodiment of my invention is illustrated in the accompanying drawings wherein similar characters of reference designate corresponding parts and wherein:

Figure 5 is a side elevational view taken substantially along line 5—5 of Figure 1 at right angles to that at which Figure 4 is taken.

Figures 1, 2:
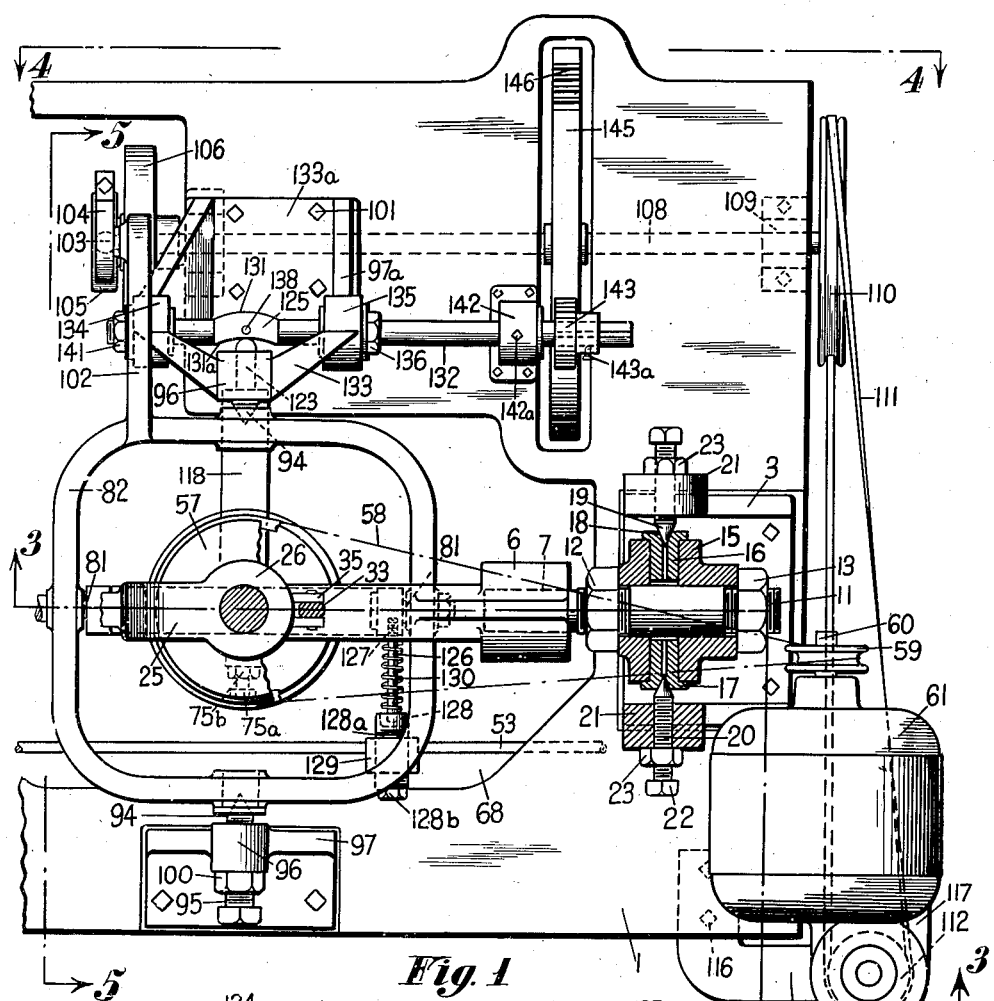
Figure 1 is a view mainly in plan but partly in section of a machine constructed according to my invention.
Figure 2 is a detail partly in plan and partly in section showing the template mechanism used for controlling movement of the lens blank carrier in one direction.

With reference to the drawings, I have illustrated my machine as comprising a metal base plate 1 of rectangular form. This base plate 1 is supported by legs 2 disposed at each corner thereof. Two levels 1a and 1b of the air bubble type may be provided on plate 1 for indicating when it is level.

Above this base plate 1 I mount a lens grinding tool and driving mechanism therefor. Thus, a U-shaped vertical standard 3 is provided at the rear side of the base plate 1. This standard 3 is suitably secured to the base plate 1. The supporting standard 3 pivotally supports on its upper end a forwardly projecting arm 4 which is adapted to support on its forward end the tool spindle. This arm 4 is provided with a depending portion 5 at its rear end. This portion 5 has a sleeve 6 (Figure 3) formed on the lower portion thereof. This sleeve 6 receives the forward end of a pin 7 which is rigidly keyed thereto by the key 8. The rear end of the pin 7 fits in a sleeve 9 and is slidable therein. The pin 7 is threaded at 10 and 11 adjacent the ends of the sleeve 9, a nut 12 being disposed on the threaded portion 10 and a nut 13 being disposed on the threaded portion 11. It will be apparent that by proper adjustment of these nuts 12 and 13, which bear against the ends of the sleeve 9, the pin 7 may be adjusted forwardly or rearwardly in the sleeve 9. It may be locked in adjusted position by means of a setscrew 14 threaded through the sleeve 9 and engaging the pin 7.

At diametrically opposed points the sleeve 9 has bosses 15 formed thereon which are provided with openings (Figure 1) for receiving bearing members 16. Each of the bearing members 16 is provided with a flange 17 on the outer end thereof for limiting inward movement thereof. Furthermore, each of the bearings 16 has a conical recess 18 formed therein for receiving the point 19 of a trunnion pin 20. The pins 20 are disposed in openings formed in sleeve-like portions 21 provided at the upper ends of the arms of the standard 3. Each of the pins 20 is threaded in the opening in the portion 21 and is provided with a head 22 on its outer end. By means of the head 22 the screw 20 may be adjusted inwardly or outwardly. It is held in adjusted position by means of a lock nut 23 threaded on the outer portion thereof and engaging the outer end of the sleeve-like portion 21. Thus, the arm 4 is mounted for swinging movement in a vertical plane about the pivot pins 20, anti-friction bearings being provided at the pivot points.

Figure 3:
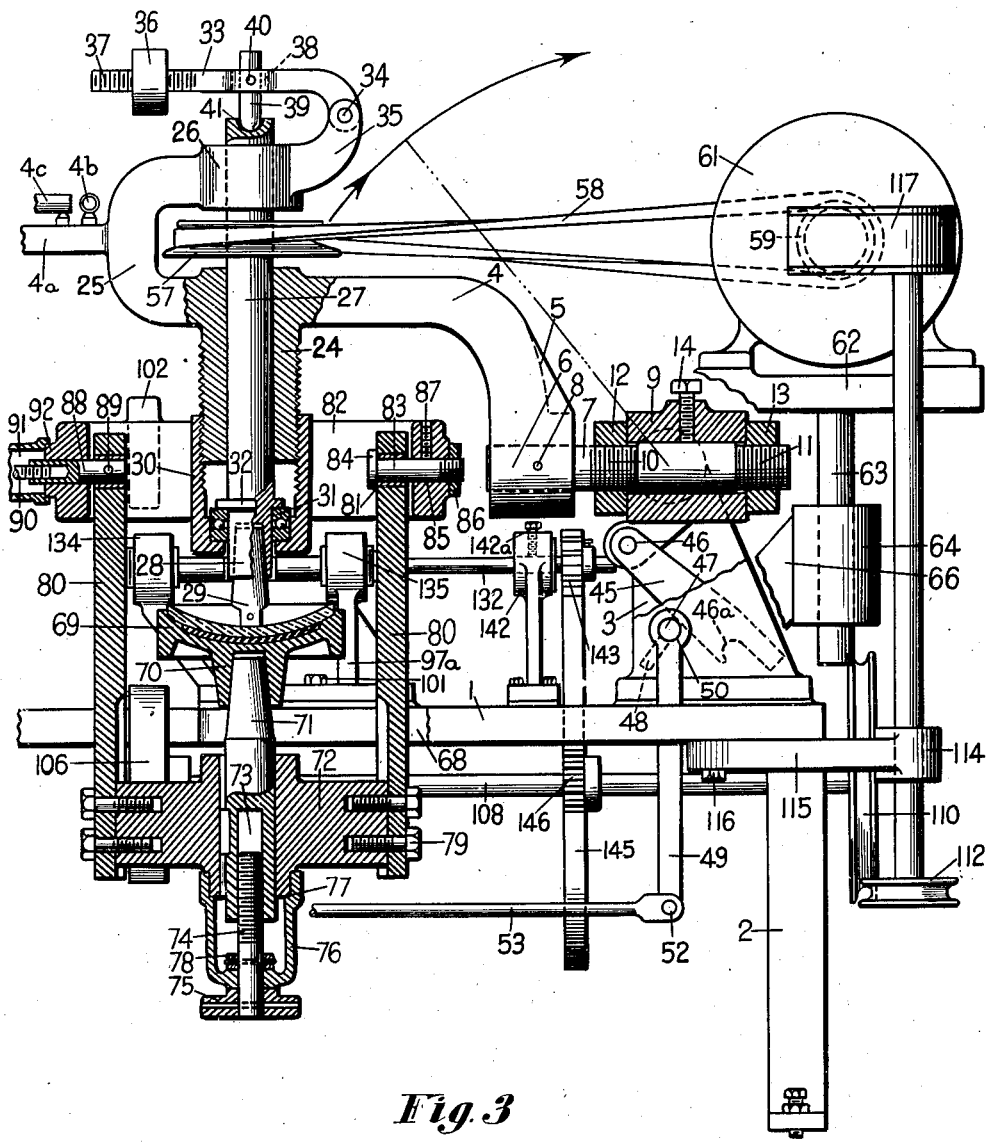
Figure 3 is a vertical sectional view taken substantially along line 3—3 of Figure 1.
Figure 4:
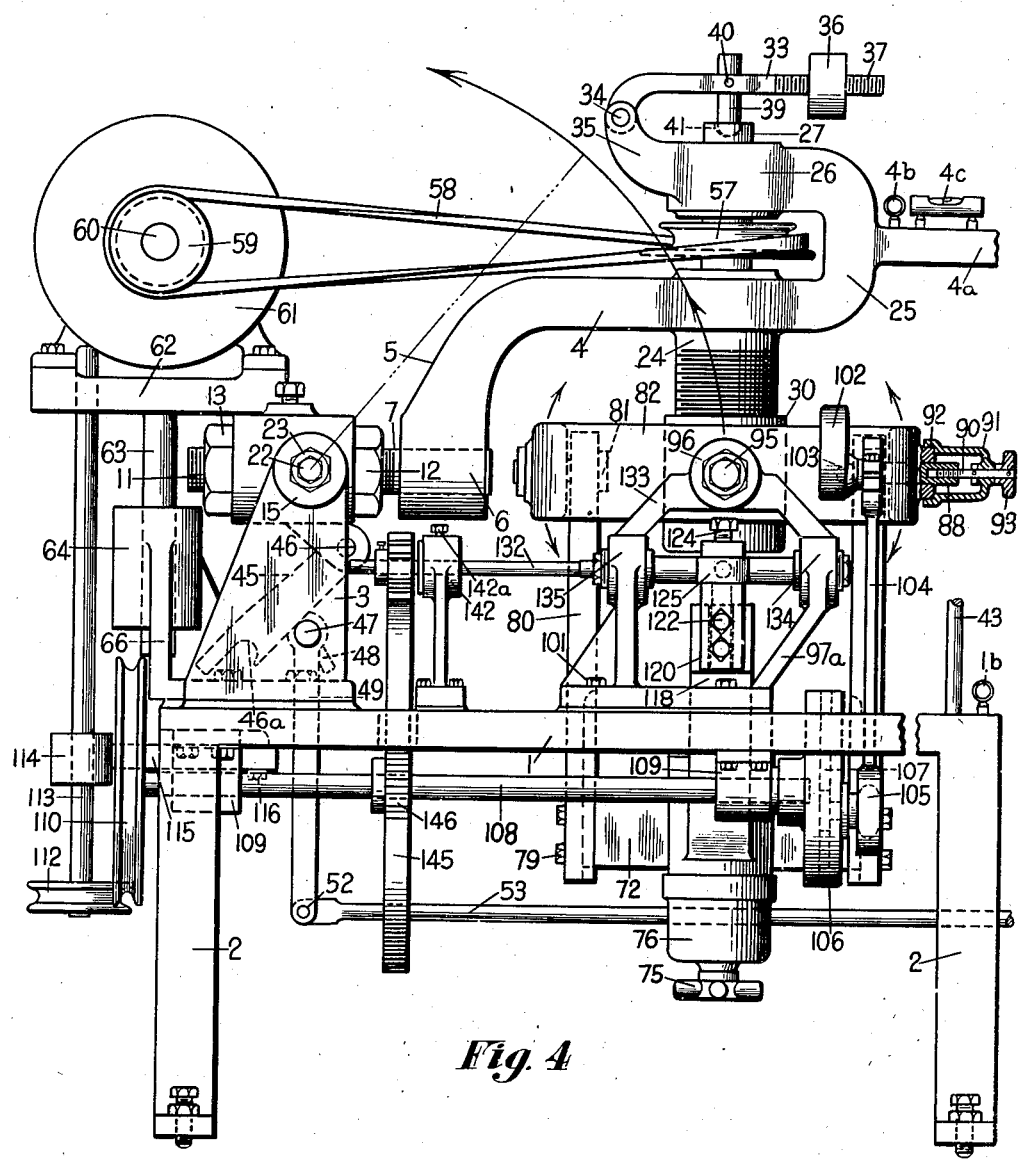
Figure 4 is a side elevational view taken substantially along line 4—4 of Figure 1.
Figure 8:
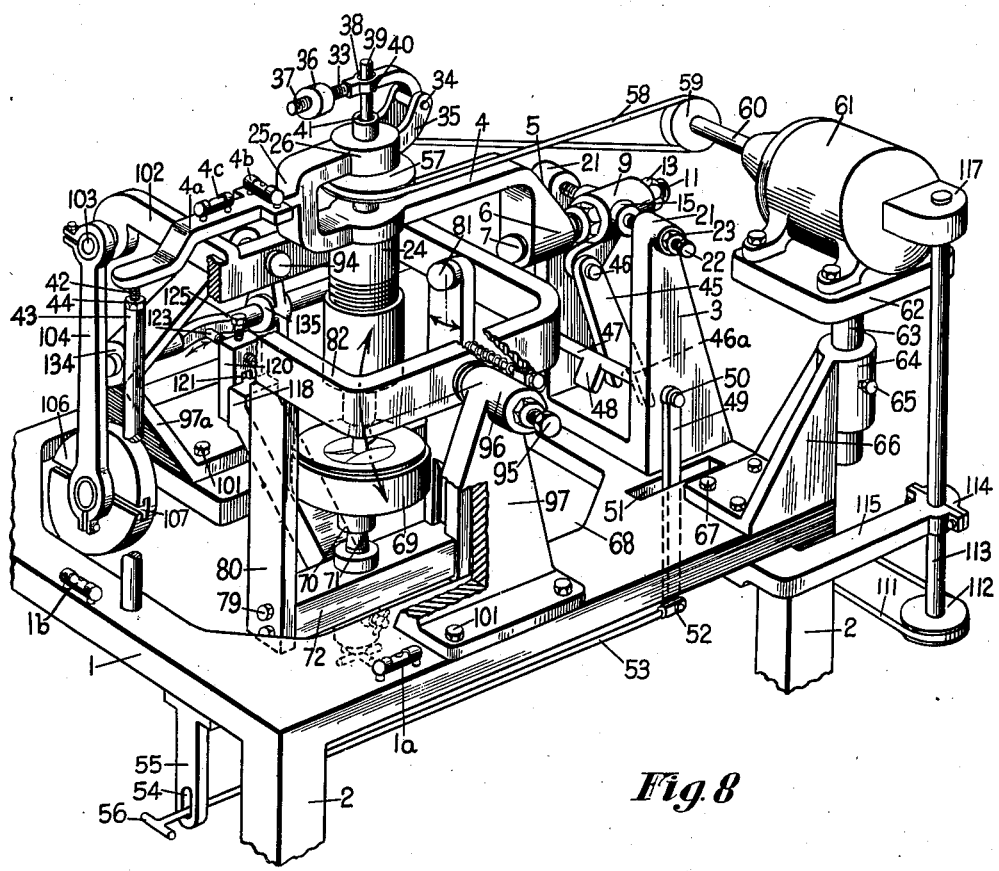
Figure 8 is a perspective view of my entire machine.

The forward end of the arm 4 has a depending sleeve-like portion 24 formed thereon, as indicated best in Figures 3, 4 and 8. Above this sleeve-like portion 24, a yoke portion 25 is formed. The yoke 25 has a bearing 26 on its upper end which is provided with an opening in alignment with the opening formed in the sleeve portion 24. The opening in portion 26 and the opening in sleeve 24 receive a tool carrying spindle 27. This spindle is free to rotate in members 24 and 26 and to move vertically therein. The tool carrying spindle 27 has a tapered socket formed in its lower end for receiving the tapered upper end of a tool member 28. This tool member has a reduced cylindrical lower end 29. As shown, the spindle 27 projects from the lower end of the sleeve 24. This sleeve has a cap 30 threaded on its lower end. The cap 30 has a central opening through which the lower end of the spindle 27 passes. The cap 30 carries on its interior a ball bearing 31. The spindle 27 is provided with a peripheral flange 32 which is adapted to engage this bearing 31 after the spindle 27 has reached the extent of its downward movement relative to the sleeve 24. As will be explained later, this determines the depth to which the tool 28 will grind into the lens blanks. This may be varied by rotation of the cap 30 relative to the sleeve 24 to vary the point at which the flange 32 will engage the bearing 31.

The spindle 27 is forced downwardly through the sleeve 24 so that the tool 28 will contact firmly with the lens blank until the grinding operation is completed, as will be explained more in detail hereinafter, which will be at the time the flange 32 rests on the upper surface of bearing 31. For forcing the spindle 27 downwardly within the sleeve 24 I provide a weight carrying horizontally disposed arm 33 adjacent the upper end of the spindle 27. This arm 33 is pivoted at 34 to a lug 35 formed on member 26. The outer end of this arm 33 carries a cylindrical weight 36 which is threaded onto a threaded portion 37 of the arm 33. Intermediate its ends the arm 33 is provided with a large opening 38 which receives a depending pin 39. A small pivot pin 40 holds the pin 39 in position within opening 38. This pin has a rounded lowered end which fits in a cup 41 formed in the upper end of the spindle 27. It will be apparent that this weight carrying arm 33 will serve to force the spindle 27 downwardly. The amount of this force may be varied by adjusting the weight 36 along the threaded portion 37 of the arm 33.

For limiting downward swinging movement of the arm 4 about its pivot, I provide a stop pin 42 which is threaded into the upper end of a vertical rod 43 which has its lower end threaded into the base plate 1. The upper end of this pin 42 engages the lower surface of an extension 4a of the arm 4, as indicated best in Figures 5 and 8. The pin 42 may be locked in position by a locknut 44 disposed on the pin 42 and engaging the upper end of the rod 43. When the grinding operation is being performed the arm 4 will be swung downwardly until the extension 4a contacts with the pin 42. The extension 4a may be used as a handle for swinging arm 4. The cap 30 will be set to permit the spindle 27 to move downwardly a predetermined amount, which will be the thickness of the material to be ground from the lens blank. The weight carrying arm 33 will serve to keep the tool 28 in contact with the lens blank and to move the spindle downwardly until the flange 32 rests on bearing 31. Levels 4b and 4c of the air bubble type may be provided on the extension 4a. These levels are disposed at right angles to each other and will indicate when arm 4 is level. The arm 4 may be swung upwardly into inoperative position about the pivot pins 20 so that the tool will be moved away from the lens blank. It will be held in such raised position by means of a latch member 45. This latch member is pivoted to the lower portion of the sleeve 9 as at 46. It is provided with a notched lower end 46a which is adapted to engage a transversely extending keeper 47 which is in the form of a round pin and is rotatably carried by the standard 3.

This keeper 47 has a cam portion 48 formed thereon. The keeper 47 is adapted to be rotated by means of a lever 49 keyed on one end thereof as indicated at 50. This lever 49 passes downwardly through a slot 51 formed in the base plate 1. The lower end of the lever 49 is pivotally connected at 52 to the rear end of a rod 53. This rod 53 projects forwardly through a slot 54 formed in a support 55 depending from the forward portion of the base plate. This rod has a handle 56 formed on the forward end thereof. When the arm 4 is swung upwardly the latch 45 automatically swings forwardly and the notched portion 46a engages the keeper 47. In order to again lower the arm 4, it is merely necessary to lift it slightly and pull forwardly on the rod 53. This will cause rotation of the keeper 47 and will cause the cam portion 48 to swing upwardly contacting the latch 45 and releasing it from the keeper 47. If the rod 53 is again pushed rearwardly the keeper 47 will be rotated to its original position. If the arm 4 is again swung upwardly, the latch 45 will again engage the keeper 47 automatically.

For driving the spindle 27, a pulley 57 is keyed thereon within the yoke 25. The space within the yoke 25 is sufficient to permit the required vertical movement of the spindle 27 without having the pulley 57 contact with the upper bearing member 26 or the lower sleeve 24. This pulley 57 receives a belt 58 which passes rearwardly along the arm 4 and around a second pulley 59. This pulley is keyed on the outer end of a shaft 60 driven by an electric motor 61. The motor 61 is carried by a plate 62 which is supported on the upper end of pin 63. This pin is vertically adjustable within a sleeve 64 in which it is disposed and is held in adjusted position by means of a screw 65 threaded through the sleeve 64 and engaging the pin 63. The sleeve 64 is carried by a support 66 which is bolted to a rear corner of the base plate 1 by means of bolts 67.

The base plate 1 has a large opening 68 formed therein. Within this opening is disposed the supporting means for the lens blank carrier 69 which is adapted to be swung or oscillated in two directions at right angles to each other.

The lens blank carrier 69 has a tapered chuck 70 (Figure 3) which is adapted to be slipped over the upper end of a tapered pin 71. This pin is mounted for vertical sliding movement within a bearing formed in a block 72. The pin 71 is provided with a hollow interiorly threaded lower end 73 which receives the threaded upper end of a screw 74. This screw has a knob 75 keyed thereon which engages the outer portion of a sleeve 76. This sleeve 76 is disposed around the screw 74 and is suitably held in position on a boss 77 formed on the lower side of the member 72. A collar 78 is keyed to the screw 74 and engages the inner surface of the outer end of sleeve 76. It will be apparent that by rotating the screw 74, the pin 71, which is splined in member 72, will be raised or lowered relative to the member 72. Thus, the height of the carrier 69 above the member 72 may be adjusted. A setscrew 75a, held in adjusted position, by lock nut 75b, is threaded into member 72 and its inner end engages pin 71 for locking it in adjusted position.

The member 72 has each end bolted by the bolts 79 to the lower end of an arm 80. The arms 80 are disposed in parallel relationship and extend upwardly. These arms 80 have their upper ends pivotally connected at oppositely disposed points, by pivot structures indicated generally by the numerals 81, to a substantially rectangular supporting member 82. One of the pivot structures 81 includes a pin 83 (Figure 3) which extends through an opening in the upper end of one of the arms 80 and which has a head 84 formed on its inner end. The arm 80 is adapted to rotate about the pin 83. The outer end of the pin 83 is disposed for axial movement in an opening 85 formed in member 82. The pin 83 may be moved axially by means of a collar 86 threaded on the outer end thereof and engaging the outer surface of member 82. However, the pin 83 is normally held from axial movement by means of a set screw 87. The other pivot structure 81 comprises a pivot pin 88 which is keyed by a key 89 in an opening formed in the upper end of the other arm 80. This pin 88 has its outer end mounted for axial movement in an opening formed in the member 82. The outer end of the pin 88 is hollow and has a threaded socket which receives the threaded inner end of a screw 90. This screw 90 passes outwardly through the closed outer end of a sleeve-like member 91. The member 91 has its inner end suitably secured to a boss 92 formed on the outer surface of the member 82. As shown in Figure 4, the outer end of the screw 90 has a knob 93 keyed thereon which engages the outer portion of the member 91. It will be apparent that by rotating the knob 93, the pin 88 may be moved axially. By adjustment of the screw 90 and adjustment of the nut 86, the lens blank carrier supporting unit comprising arms 80, member 72 and pin 71, may be properly centered relative to the member 82.

Thus, the lens blank carrier supporting unit, including the arms 80, swings about the pivot points 81 which are in alignment with each other. The member 82 is pivotally mounted so that it may swing in a direction at right angles to the direction of the swinging movement of the arms 80. This member 82 swings about the pivot points indicated generally by the numerals 94. The two pivots are of identical structure. Each of the pivots comprises a pivot pin 95 threaded through a sleeve 96 formed on the upper end of either the vertical standard 97 or the vertical standard 97a which is slightly different. Each pin 95 has a pointed or cone-shaped inner end 98 which fits into a similarly shaped cup or socket formed in a boss 99 on the outer surface of member 82, as indicated best in Figures 5 and 8. The pins 95 may be rotated to move them in and out relative to the sleeves 96 and may be held in adjusted position by means of lock nuts 100. Thus, the member 82 may be centered relative to the standards 97 and 97a by proper adjustment of the pins 95. The pivot points 94 are located midway between the forward and rear sides of the member 82 while the pivot points 81 are located midway between the other sides of the member 82, as indicated best in Figure 1. Thus the lens blank carrier support will swing or oscillate through one vertical plane about the pivots 81 and in another vertical plane at right angles to the first plane about the pivots 94. The standards 97 and 97a have their lower ends bolted to the upper surface of the base plate 1 by means of bolts 101.

For causing the member 82 to swing or oscillate about the pivots 94, I provide the following structure. One side of the member 82 is provided with a rigid outwardly extending horizontally disposed arm 102. This arm extends parallel to a line passing through the axes of the pivot points 94. The outer end of this arm 102 is connected by a ball and socket bearing 103 to the upper end of a pitman 104. The bearing 103 is such that it will permit universal movement of the arm 102 and the pitman 104 relative to each other. The lower end of the pitman 104 is connected by a ball and socket pivot structure 105 eccentrically disposed on a disk 106. The pivot structure 105 is adapted to be adjusted along a slot 107, which is T-shaped in cross-section and which is formed in one face of the disk 106, and is held in any adjusted position in the usual manner. By adjusting the pivot point 105 eccentrically of the disk to any desired position, the extent of oscillation of the member 82 may be varied as will be well understood.

As indicated best in Figures 4 and 5, the disk 106 is keyed on the end of a rearwardly extending shaft 108 which is disposed below the base plate 1 and is rotatably mounted in bearings 109 secured to the lower surface thereof. The rear end of this shaft 108 has a pulley 110 keyed thereon. This pulley 110 is driven by a belt 111 which extends laterally and passes around a pulley 112 (Figures 1 and 8) which is keyed on the lower end of a shaft 113. This shaft 113 has its lower end rotatably mounted in a bearing 114 formed on the rear end of a horizontally disposed arm 115 which has its forward end secured to the lower surface of the base plate 1 by bolts 116 (Figure 3). The shaft 113 extends upwardly into a housing 117, secured to the motor 61, which contains speed reduction gearing driven by the motor 61.

For causing the lens blank carrier supporting unit, including arms 80, to swing about the pivots 81, I provide the following structure. As shown in Figure 5 an upwardly and laterally directed arm 118 is integrally secured to the member 72. This arm 118 has a flat vertical surface 119 formed on its upper end which is engaged by a block 120. This block 120 is provided with a vertical slot 121 (Figure 8) which receives a tongue 121a. The block 120 is normally clamped against the surface 119 by means of bolts 122. It will be apparent that the block 120 may be adjusted vertically relative to the upper end of the arm 118. The block 120 carries a horizontally disposed pin 123 which is threaded through the upper end thereof and which may be held in any position to which it is adjusted by means of a setscrew 124.

Figure 5:
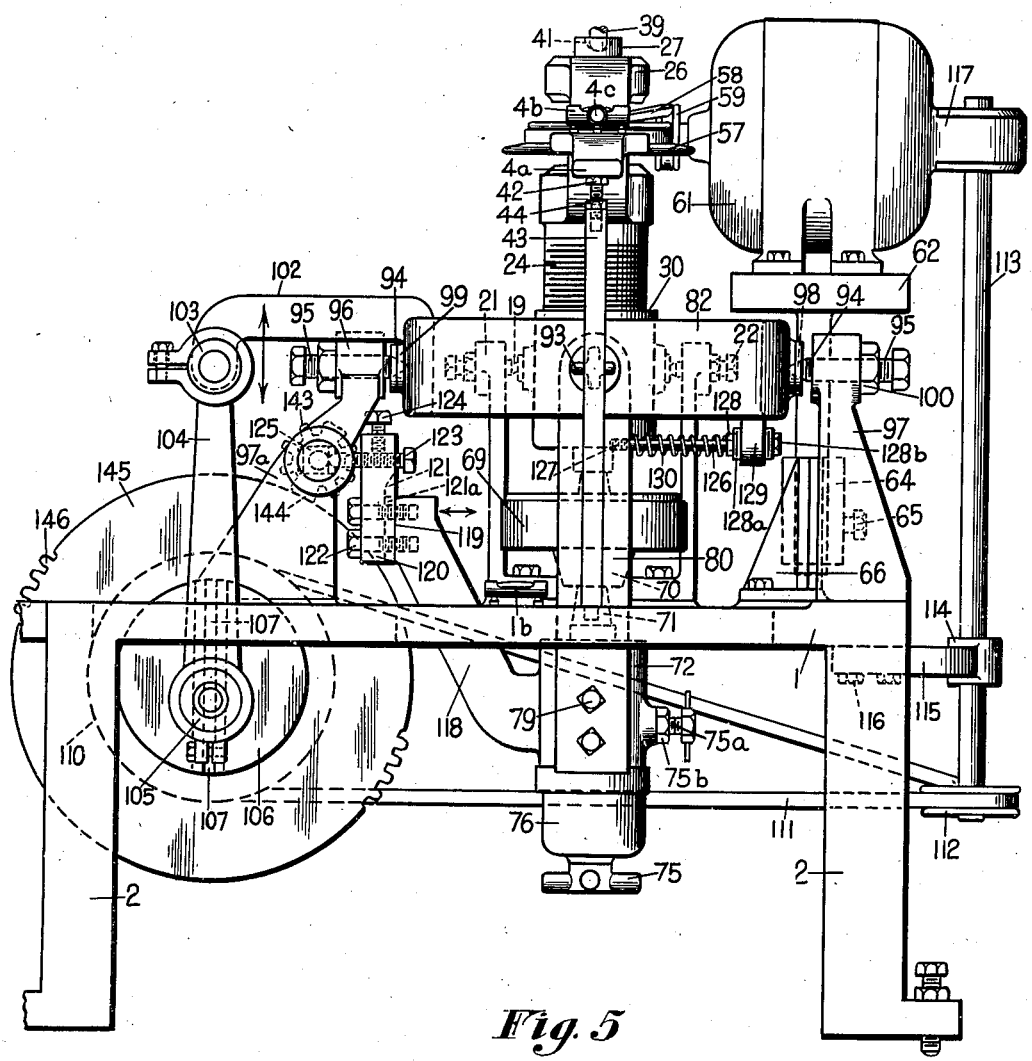

The outer end of the pin 123 is held in resilient engagement with a template 125 by means of the structure illustrated best in Figures 1 and 5. This structure comprises a rod or pin 126 which is disposed substantially parallel to pin 123. The pin 126 has one end threaded into an opening 127 formed in one of the vertically disposed arms 80. A compression spring 130 is disposed in surrounding relationship to the pin 126 and has one end bearing against the arm 80 and the other end disposed in a cup 128 mounted on the lug 129. This cup 128 is formed on the inner end of a substantially cylindrical member 128a threaded into lug 129 and which may be rotated by means of the angular outer end 128b. By adjusting member 128a in lug 129, the force of spring 130 may be varied. Thus, this spring structure will serve to swing the lens blank carrier supporting unit, including arms 80, about the pivot points 81, to the left (Figure 5) for forcing the pin 123 in resilient but firm contact with the template 125.

Figure 6:
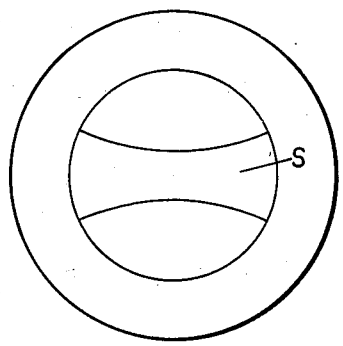
Figure 6 is a plan view of a lens blank which may be produced on my machine.
Figure 7:
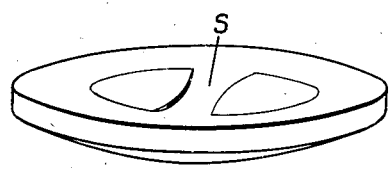
Figure 7 is a perspective view of the lens blank.
Figure 9:
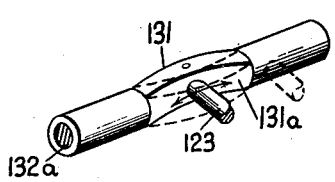
Figure 9 is a perspective view of a template which I may employ on my machine.

The template 125 may be of any suitable shape depending upon the shape of the segment to be produced. If it is desired to produce a segment S of the shape shown in Figures 6 and 7, a template of the shape shown in Figure 9 should be used. This template is of arcuate form and has parallel cam faces 131 and 131a (Figure 2) adapted to be alternately engaged by the pin 123, as will be described later. The template 125 has an opening extending therethrough and is disposed on a shaft 132 from which it can be removed and replaced with a template of different form. This shaft 132 is supported in horizontal position for rotation by the standard 97a which has an inverted V-shaped upper portion 133 (Figure 1) and a lower base portion 133a. Bearing portions 134 and 135 are formed on the standard 97a. The shaft 132 extends through the bearing 135. The shaft 132 has a sleeve portion 136 thereon which is free to rotate thereon but will not move longitudinally thereof. This sleeve 136 is threaded into the bearing 135. By rotating the sleeve 136, the shaft 132 may be moved longitudinally of the bearing 135. The portion 132a of the shaft 132 extending into bearing 134 is reduced and has a sleeve 137 removably disposed thereon. The template 125 is disposed between the sleeve 137 and the enlarged portion of the shaft 132. It may be keyed on the shaft by a key 138. The sleeve 137 has a shoulder 139 which engages a washer 140 that contacts with a sleeve 141 which is threaded into the bearing 134. By proper manipulation of the sleeves 136 and 141, the shaft 132 may be moved longitudinally to properly position the template relative to the pin 123. It will be apparent that the template 125 may be easily removed from the shaft 132 by rotating sleeve 141 in the proper direction to remove the sleeve 137, washer 139 and the threaded sleeve 141 from the shaft 132.

A third bearing 142 may be provided for the rear end of the shaft 132. On the rear end of the shaft 132 a pinion 143 is keyed thereon by means of removable key 143a (Figure 3). This pinion 143 is of unusual form in that it has a pair of relatively wide teeth 144 disposed at diametrically opposed points. The pinion 143 engages a relatively large disk 145 which is keyed on the shaft 108. The disk 145 is, therefore, continuously driven. At diametrically opposed points it is provided with sets of gear teeth 146. When either of the wide teeth 144 is in engagement with the unbroken edge of the disk 145, the disk 145 may rotate without rotating the pinion 143. However, as soon as either of the gear teeth portions 146 engage the pinion 143, the pinion 143 will be rotated and, consequently, the shaft 132 will be rotated. The gear teeth of each portion 146 are suitable in number to cause the shaft 132 to rotate through one-half a revolution each time the teeth engage the pinion 143.

Thus, twice during the rotation of the disk 145, the template 125 will be rotated through one-half a revolution. Furthermore, this rotation is so synchronized with the oscillation of the lens blank carrier supporting unit (produced by pitman 104 swinging member 82 about pivots 94) that the shaft 132 will be rotated only when the pin 123 has reached a position beyond either end of the template 125, as shown by dotted lines in Figure 2. Thus, with this structure, during swinging movement of the lens blank carrier 69 in one direction about the pivot points 94 the pin 123 will be in engagement with the surface 131 of the template and during swinging movement of the lens blank carrier 69 in the opposite direction, the pin 123 will be in engagement with the opposite surface 131a of the template. This will cause the lens blank carrier 69 to swing about pivot points 81 in one direction as it oscillates in one direction about pivot points 94, and in an opposite direction as it oscillates in a reverse direction about the pivot points 94. This relative movement of the lens blank carrier 69 and the tool 28 member 28 will produce a segment of the shape shown in Figures 6 and 7.

Figure 10:
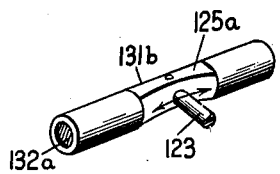
Figure 10 is a similar view of a different form of template which I may use on my machine.
Figure 11:
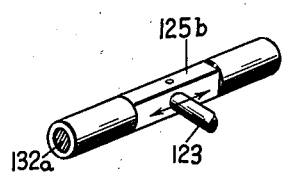
Figure 11 is a similar view of a still different form of template which may be used on my machine.

If it is desired to produce segments of other shapes different shaped templates may be used. For example, if it is desired to produce a shape similar to that shown in Figure 12 of my said co-pending application, the template 125a, shown in Figure 10, may be employed. However, in this instance, it will be necessary to render inoperative the rotating mechanism for the shaft 132. This may be accomplished by removing pinion 143 from shaft 132 and tightening screw 142a (Figure 3), threaded in bearing 142, to prevent the shaft 132 from rotating. In producing an arcuate segment of the type shown in Figure 12 of my co-pending application, it will be understood that it is merely necessary for the pin 123 to engage a single arcuate surface 131a. If it is desired to produce a straight segment of the type shown in Figures 7, 9 and 10 of said co-pending application, the opposite edge 131b of the template may be employed without the template rotating means, or the template 125b shown in Figure 11, may be used and the rotating means may still be employed. Both sides of this template are straight, as shown. When a straight segment is being produced, it will be understood that the lens blank carrier 69 will merely oscillate about the pivots 94 and will not swing about the pivots 81. Various other forms of templates may be employed depending upon the shape of segment desired.

When using my machine, the lens blank is first suitably mounted on the lens blank carrier 69 in any suitable manner. The lens blank carrier is then mounted on the pin 71. The proper adjustments of the machine are then made. The cap 30 is rotated on the sleeve 24 to the proper position to determine the lowermost position to which the spindle 27 may move, and consequently, the depth to which the tool 28 will grind the lens blank. The weight 36 is adjusted to produce the proper pressure of the tool on the lens blank. The pivot pins 19 are properly adjusted to properly position the arm 4 so that the tool 28 will be in the proper position relative to the lens blank. The lens blank carrier 69 is adjusted to the proper height by means of the screw 74. This adjustment will determine the radius of curvature of the surface of the segment produced on the lens blank. The pin 7, associated with arm 4, is adjusted longitudinally so that the axes of spindles 27 and 71 will coincide. The pin 123 is adjusted to the proper height by movement of block 120. The template 125 is adjusted to the proper position, on shaft 132, relative to pin 123. The size of the segment will be adjusted by adjusting pin 123 in block 120. The machine is now ready for operation.

It will be apparent that the lens blank will be moved relative to the tool, during the operation of the machine, to produce the proper type of segment. The cylindrical tool, which is preferably a ring tool of the well known type, rotating at a high rate of speed will produce a spherical surface on the lens blank.

It will be apparent from the above description that I have provided a machine for producing one-piece multifocal ophthalmic lenses having many advantages. My machine is of such a nature that it may be used for producing multifocal one-piece lenses having segments of various predetermined outlines, sizes and curvatures. My machine is simple in structure, easy to operate and is positive and efficient in operation. It will produce segments of a predetermined shape in an accurate manner. It may be used for producing segments of identical shape in a multiplicity of lens blanks.

Various other advantages will be apparent from the preceding description, the drawings and the following claims.

Having thus described my invention, what I claim is:

1. Apparatus of the type described comprising a lens blank carrier, a support for said carrier mounted for swinging movement about two axes disposed at right angles to each other, a generating tool mounted on a rotatable tool-carrying spindle and disposed in position to work upon a lens blank mounted on said carrier, means for oscillating said carrier support about one of said axes, additional means for controlling the movement of the carrier support about the other of said axes, said additional means including a template, and means connected to said carrier support for engaging said template.

2. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, additional means for controlling the movement of the carrier support about the other of said axes, said additional means including a template disposed in substantially parallel relationship to the last-mentioned axis, and means carried by the lens blank carrier support for engaging said template.

3. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, additional means for controlling the movement of the carrier support about the other of said axes, said additional means including a template disposed in substantially parallel relationship to the last-mentioned axes, means carried by the lens blank carrier support for engaging said template, and means for adjusting said lens blank carrier vertically on said support.

4. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, additional means for controlling the movement of the carrier support about the other of said axes, said additional means including a template disposed in substantially parallel relationship to the last-mentioned axis, a member carried by the lens blank carrier support for engaging said template, said template having two oppositely disposed vertical surfaces adapted to be engaged by said member alternately, and means for rotating said template to present a different surface of the template to said member each time said support reaches the extent of its oscillation in each direction.

5. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, additional means for controlling the movement of the carrier support about the other of said axes, said additional means including a template disposed in substantially parallel relationship to the last-mentioned axis, a member carried by the lens blank carrier support for engaging said template, said template having two oppositely disposed vertical surfaces adapted to be engaged by said member alternately, means for rotating said template to present a different surface of the template to said member each time said support reaches the extent of its oscillation in each direction, and means for adjusting said lens blank carrier vertically on said support.

6. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, additional means for controlling the movement of the carrier support about the other of said axes, said additional means including a template disposed in substantially parallel relationship to the last-mentioned axis, a member carried by the lens blank carrier support for engaging said template, said member being adjustable relative to the lens blank carrier support to vary the distance between said support and said template.

7. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, additional means for controlling the movement of the carrier support about the other of said axes, said additional means including a template disposed in substantially parallel relationship to the last-mentioned axes, a member carried by the lens blank carrier support for engaging said template, said member being adjustable relative to the lens blank carrier support to vary the distance between said support and said template, and means for adjusting said lens blank carrier vertically on said support.

8. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, said means being adjustable to vary the extent of the oscillation, additional means for controlling the movement of the carrier support about the other of said axes, said additional means including a template disposed in substantially parallel relationship to the last-mentioned axis, and a member carried by the lens blank carrier support for engaging said template.

9. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, said means being adjustable to vary the extent of the oscillation, additional means for controlling the movement of the carrier support about the other of said axes, said additional means including a template disposed in substantially parallel relationship to the last-mentioned axis, and a member carried by the lens blank carrier support for engaging said template, said member being adjustable relative to the lens blank carrier support to vary the distance between said support and said template.

10. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means of oscillating said carrier support about one of said axes, said means being adjustable to vary the extent of the oscillation, additional means for controlling the movement of the carrier support about the other of said axes, said additional means including a template disposed in substantially parallel relationship to the last-mentioned axis, a member carried by the lens blank carrier support for engaging said template, said member being adjustable relative to said support to vary the distance between said support and said template, said lens blank carrier being adjustable vertically on said support.

11. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, additional means for controlling the movement of the carrier support about the other of said axes, said additional means including a template disposed in substantially parallel relationship to the last-mentioned axis, a member carried by the lens carrier support for engaging said template, said template being adjustable longitudinally relative to said member.

12. Apparatus of the type described comprising a lens blank carrier, a support for said carrier mounted for swinging movement about two horizontal axes disposed at right angles to each other, a generating tool mounted on a rotatable tool-carrying spindle and disposed in position to work upon a lens blank mounted on said carrier, means for oscillating said carrier support about one of said axes, additional means for controlling the movement of the carrier support about the other of said axes, said additional means including a template carried by a shaft disposed in substantially parallel relationship to the last-mentioned axis, a member carried by the lens blank carrier support for engaging said template, said template having two oppositely disposed vertical surfaces adapted to be engaged by said member alternately, means for rotating said shaft through one half revolution each time said support reaches the extent of its oscillation in each direction to present a different surface of the template to said member, said template being adjustable axially of the shaft relative to said member.

13. Apparatus of the type described comprising a lens blank carrier, a support for said carrier, a generating tool, a support for said generating tool adapted to support it in position to work upon a lens blank mounted on said carrier, one of said supports being mounted for swinging movement about two axes disposed at right angles to each other, means for oscillating said last-named support about one of said axes, additional means for controlling the movement of said support about the other of said axes, said additional means including a template, and means connected to said support for engaging said template.

14. Apparatus of the type described comprising a lens blank carrier, a support for said carrier, a generating tool, a support for said generating tool adapted to support it in position to work upon a lens blank mounted on said carrier, one of said supports being mounted for swinging movement about two axes disposed at right angles to each other, means for oscillating said last-named support about one of said axes, additional means for controlling the movement of said support about the other of said axes, said additional means including a template disposed in substantially parallel relationship to the last-mentioned axis, and means carried by said support for engaging said template.

15. Apparatus of the type described comprising a lens blank carrier, a support for said carrier mounted for swinging movement about two horizontal axes disposed at right angles to each other, a generating tool, a support for said tool for supporting it in position to work upon a lens blank mounted on said carrier, means for oscillating said carrier support about one of said axes, additional means for controlling the movement of the carrier support about the other of said axes, said additional means including a template disposed in substantially parallel relationship to the last-mentioned axis, and means carried by the lens blank carrier support for engaging said template.

LOWELL L. HOUCHIN.